United States Patent [19]
Turner, Jr.

[11] Patent Number: 4,673,496
[45] Date of Patent: Jun. 16, 1987

[54] DRUM FILTER TAKE-OFF

[76] Inventor: Ralph W. Turner, Jr., 1577 River Rd., Brunswick, Me. 04011

[21] Appl. No.: 774,139

[22] Filed: Sep. 9, 1985

[51] Int. Cl.$^4$ .................... B01D 33/06; B01D 33/36
[52] U.S. Cl. ................................ 210/232; 210/236; 210/386; 210/396; 210/402; 210/404; 162/306; 162/323
[58] Field of Search ............. 210/386, 396, 402, 404, 210/397, 232, 236; 162/306, 323, 331, 357

[56] References Cited

U.S. PATENT DOCUMENTS

| | | | |
|---|---|---|---|
| Re. 21,201 | 9/1939 | Qviller | 162/297 |
| 1,914,742 | 6/1933 | Hillier | 210/404 |
| 2,060,896 | 11/1936 | Raisch | 210/386 |
| 2,363,840 | 11/1944 | Denhard | 210/391 |
| 2,689,654 | 9/1954 | Ohlstrom | 210/386 |
| 2,753,766 | 7/1956 | Simpson | 210/386 |
| 2,754,007 | 7/1956 | Leffler | 210/392 |
| 2,952,317 | 9/1960 | Majanlahti | 162/357 |
| 3,032,201 | 5/1962 | Rich | 210/386 |
| 3,409,139 | 11/1968 | Jackson et al. | 210/404 |
| 3,530,992 | 9/1970 | Turner, Jr. | 210/392 |
| 3,772,144 | 11/1973 | Luthi et al. | 210/386 |
| 3,814,260 | 6/1974 | Daubman et al. | 210/396 |
| 3,919,088 | 11/1975 | Doncer et al. | 210/402 |
| 4,325,717 | 4/1982 | Crowley, Jr. | 210/396 |
| 4,470,913 | 9/1984 | Kieronski | 210/402 |

FOREIGN PATENT DOCUMENTS 57153 10/1936 Norway.
65681 3/1943 Norway.

OTHER PUBLICATIONS

Paper Trade Journal, Feb. 15, 1979, p. 6.

*Primary Examiner*—Richard V. Fisher
*Assistant Examiner*—Linda S. Evans

[57] ABSTRACT

Pulp sheet take-off apparatus which allows removal of drum valve parts from existing high vacuum rotary drum filters and significantly increases the production capability of existing and newly designed high vacuum rotary drum filters includes an enclosed take-off chamber that is mounted immediately adjacent and parallel to the face of the filter drum on the descending side thereof, the chamber being connected by piping to the filter drum barometric leg or other subatmospheric pressure source as a means of maintaining subatmospheric pressure in the chamber equal to or less than the internal pressure of the filter drum. A fixed pulp sheet slide is arranged to remove the pulp sheet from the filter surface while atmospheric air is prevented from entering into the chamber, and pulp sheet discharge mechanism includes a vaned discharge roll that is mounted immediately adjacent and parallel to the top surface of the stock slide structure and includes means for biasing the discharge roll against the pulp sheet and means for rotating the discharge roll in the direction of pulp sheet movement to draw the pulp sheet out of the take-off chamber between the roll and the stock slide structure. The pulp sheet may be discharged to atmosphere or directly to an air tight repulping or shredding vat following the filter drum, the repulping and shredding vats being directly connected to and maintaining the same subatmospheric pressure as the take-off chamber.

42 Claims, 12 Drawing Figures

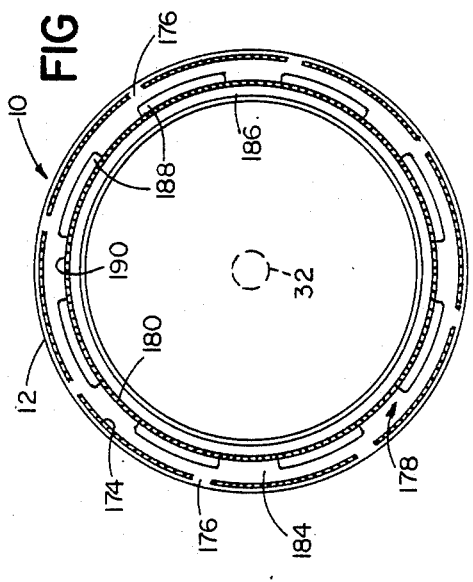
FIG 7
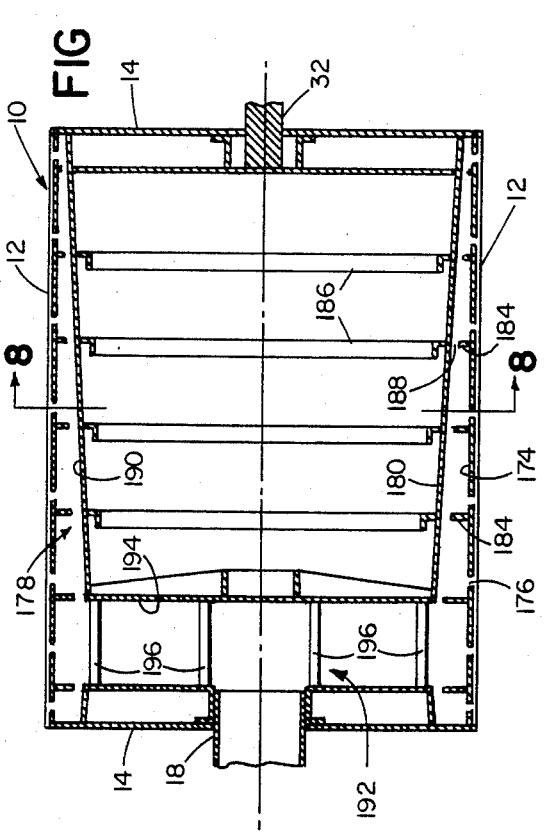
FIG 8
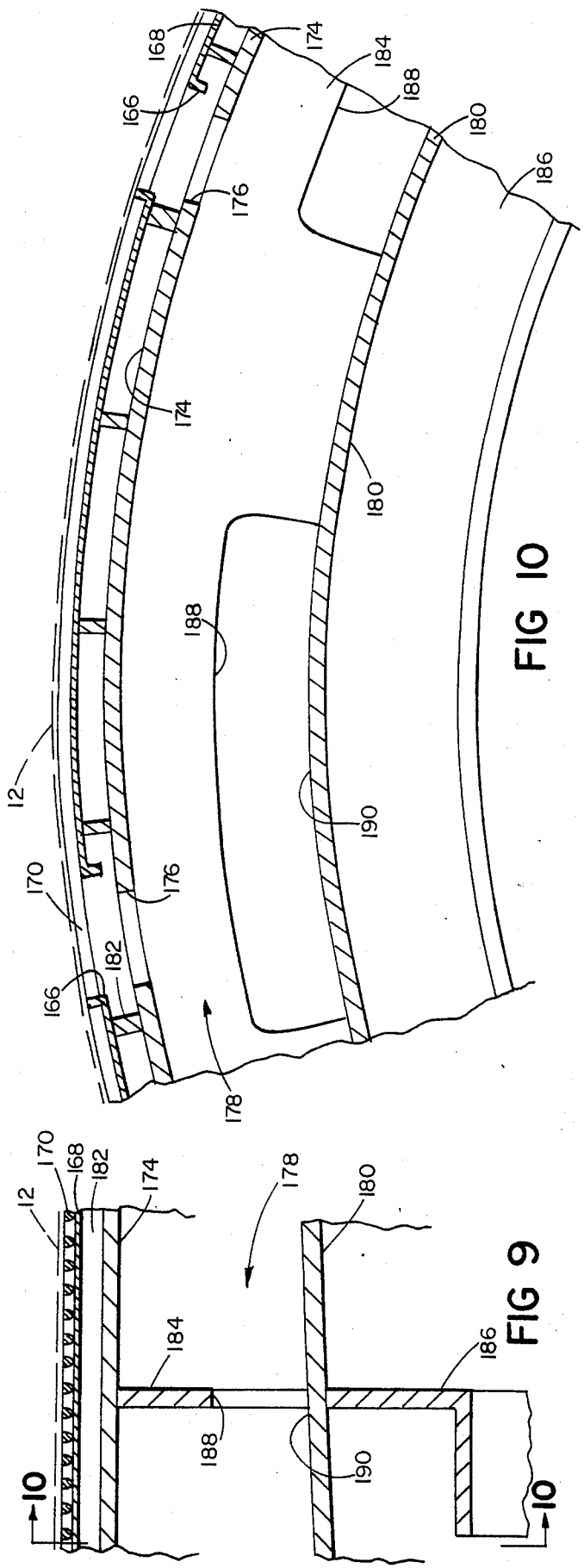
FIG 9
FIG 10

DRUM FILTER TAKE-OFF

This invention relates to filtering apparatus and more particularly to high vacuum rotary drum filters of the type of filtering slurries of pulp stock and the like for the manufacture of paper.

Rotary drum filters of this type conventionally comprise a large cylindrical drum mounted horizontally for rotation on its axis and suspended above a tank such that a lower portion of the drum is submerged in the slurry to be filtered. During operation of such a filter, a subatmospheric pressure or vacuum inside the drum applies an inwardly directed pressure differential of several inches of mercury to the foraminous surface of the drum which causes material to adhere thereto and form a filter cake with the suspending liquid being drawn through the surface into the interior of the drum, the subatmospheric pressure generally being created by single or dual barometric legs. Conventionally, the pressure differential on the filter drum surface is cut off internally by a valving mechanism in order to release the pulp sheet from the drum surface, the pulp sheet then being removed by take-off apparatus such as a blade-type device, a single vaned roll that is driven in rotation in direction opposite to the drum rotation to lift the pulp sheet, or (for relatively thin pulp sheets) a smooth (couch) roll that is pressed against the pulp sheet and lifts the sheet by suction. The valving mechanisms in such systems create serious flow restrictions within the drum, prevent free filtrate discharge from the filter during approximately thirty percent of each revolution, cause serious start and stop sequences in the filtrate flow during each revolution, severely limit the drum speed, and cause considerable quantities of atmospheric air to be taken into the filtrate system. Each of these factors tends to reduce the production capability of the rotary drum vacuum filter.

In accordance with one aspect of the invention, there is provided improved pulp sheet take-off apparatus which allows removal of drum valve parts from existing high vacuum rotary drum filters and significantly increases the production capability of existing and newly designed high vacuum rotary drum filters, and enables such drum filters to discharge less atmospheric air into the filtrate vacuum system during filtering operations, the absence of air being important in the processing of the filtrate liquid and the efficiency of the barometric leg where the vacuum is generated. More specifically, a rotary drum filter in accordance with the invention includes a filter drum, a tank for holding a slurry to be filtered with the drum being disposed in the tank for rotation about a horizontal axis and means such as a barometric leg for applying subatmospheric pressure to the drum interior. Pulp sheet discharge apparatus includes an enclosed take-off chamber that is mounted immediately adjacent and parallel to the face of the filter drum on the descending side thereof, the chamber being connected by piping to the filter drum barometric leg or other subatmospheric pressure source as a means of maintaining subatmospheric pressure in the chamber equal to or less than the internal pressure of the filter drum. A front sliding shoe attached to the chamber structure immediately adjacent and parallel to the face of the filter drum is pressed onto the pulp sheet to prevent leakage of atmospheric air into the chamber, and the margins of the shoe are sealed against atmospheric pressure along the sidewalls of the chamber. A fixed pulp sheet slide that includes an adjustable blade and a smooth top surface is arranged to remove the pulp sheet from the filter surface while atmospheric air is prevented from entering into the chamber, the lower edge of the stock slide being adapted to be submerged in the pulp slurry in the tank. Pulp sheet discharge mechanism includes a vaned discharge roll that is mounted immediately adjacent and parallel to the top surface of the stock slide structure and includes means for biasing the discharge roll against the pulp sheet and means for rotating the discharge roll in the direction of pulp sheet movement to draw the pulp sheet out of the take-off chamber between the roll and the stock slide structure, together with means to seal the top and ends of the discharge roll against atmospheric air entering the discharge chamber. The filter cake or pulp sheet may be discharged to atmosphere or directly to an air tight repulping or shredding vat following the filter drum, the repulping and shredding vats being directly connected to and maintaining the same sub-atmospheric pressure as the takeoff chamber.

Preferably, the pulp sheet take-off chamber includes a hollow structural member extending parallel to and above the face of the filter drum with sliding ways for mounting the take-off chamber on end pedestals and means for raising the entire take-off assembly for washing and/or maintenance purposes. In a particular embodiment, floating seals are secured for vertical sliding movement on the chamber side walls and include inflated tubes that allow the floating seals to follow run out of the drum and to overcome atmospheric pressure which would tend to restrict the vertical sliding action of the seals relative to the side walls. In one embodiment the system includes two juxtaposed vaned discharge rolls that are positively driven at the same surface speed as the filter drum and define a nip through which the pulp sheet is discharged into the atmosphere, while in another embodiment, a discharge roll with retractable vanes is employed, the vanes being extended to drive the pulp sheet and retracted to cooperate with a chamber seal.

In accordance with another aspect of the invention, there is provided a continuous rotary drum vacuum filter system that includes a hollow filter drum that is supported for rotation in slurry vat structure. The drum includes cylindrical structure for supporting foraminous structure through which filtrate is drawn into the interior of the drum, filtrate collection structure including filtrate transfer chamber structure and an annularly unobstructed filtrate collection chamber that extends at least about three-fourths of the axial length of the drum, the filtrate collection chamber being defined by inner shell structure that is coaxially disposed inside the cylindrical foraminous member support structure and has a drainage surface that extends to the filtrate transfer chamber structure so that an annular uninterrupted drainage region extends throughout the length of said filter drum. Subatmospheric pressure is applied to the interior of the filter drum to draw liquid from the slurry in said tank through the foraminous surface into the interior volume of the drum and form a pulp sheet on its foraminous surface. Take-off chamber structure is supported on the descending side of the drum and extends along the axial length of the foraminous surface for removing said pulp sheet from the surface of said drum. The take-off chamber structure includes spaced side wall portions disposed for sealing engagement with an arcuate length of the filter drum, entry seal means at the leading side of the chamber for sealing engagement with the pulp sheet on the drum surface to provide a chamber entrance seal, pulp sheet lifting structure within the take-off chamber for lifting the pulp sheet from the drum surface, vaned discharge roll means cooperating with the pulp sheet lifting structure for discharging the pulp sheet from said take-off chamber, discharge seal means at the trailing side of the chamber for sealing engagement with the discharge roll means to provide a chamber discharge seal, and means for applying substantially the same subatmospheric pressure to the interior of said take-off chamber as to the interior of the filter drum to provide substantially no pressure differential across the pulp sheet in the take-off chamber.

In a particular embodiment, the pressure differential across the pulp sheet in the take-off chamber is less than 0.1 inch of mercury. The drainage surface is of frustoconical configuration, the support structure includes a series of spaced annular support rings, each annular support ring having a plurality of apertures that allow the free axial flow of filtrate along the drainage surface, and supplemental support ring members inside the inner shell are in alignment with the annular support rings. The vaned discharge roll means includes cooperating upper and lower vaned discharge rolls for cooperatively engaging the pulp sheet and positively feeding it from the take-off chamber, the upper vaned discharge roll being at least twice the diameter of the lower vaned discharge roll and the roll drive means drives the upper and lower discharge rolls coordinately at the same surface speed as the filter drum. The axes of the cooperating upper and lower vaned discharge rolls define a plane that is disposed at an angle greater than ninety degrees to the pulp sheet slide structure, the upper vaned discharge roll is supported for movement towards and away from the lower discharge roll and the spacing of the upper discharge roll from the lower discharge roll may be adjusted.

Other features and advantages of the invention will be seen as the following description of particular embodiments progresses, in conjunction with the drawings in which:

FIG. 7 is a sectional view of the drum filter taken along the line 7—7 of FIG. 2;

FIG. 8 is a sectional view taken along the line 8—8 of FIG. 7;

FIG. 9 is an enlarged view of a portion of FIG. 7;

FIG. 10 is an enlarged view of a portion of FIG. 8; and

DESCRIPTION OF PARTICULAR EMBODIMENTS

Figure 1:
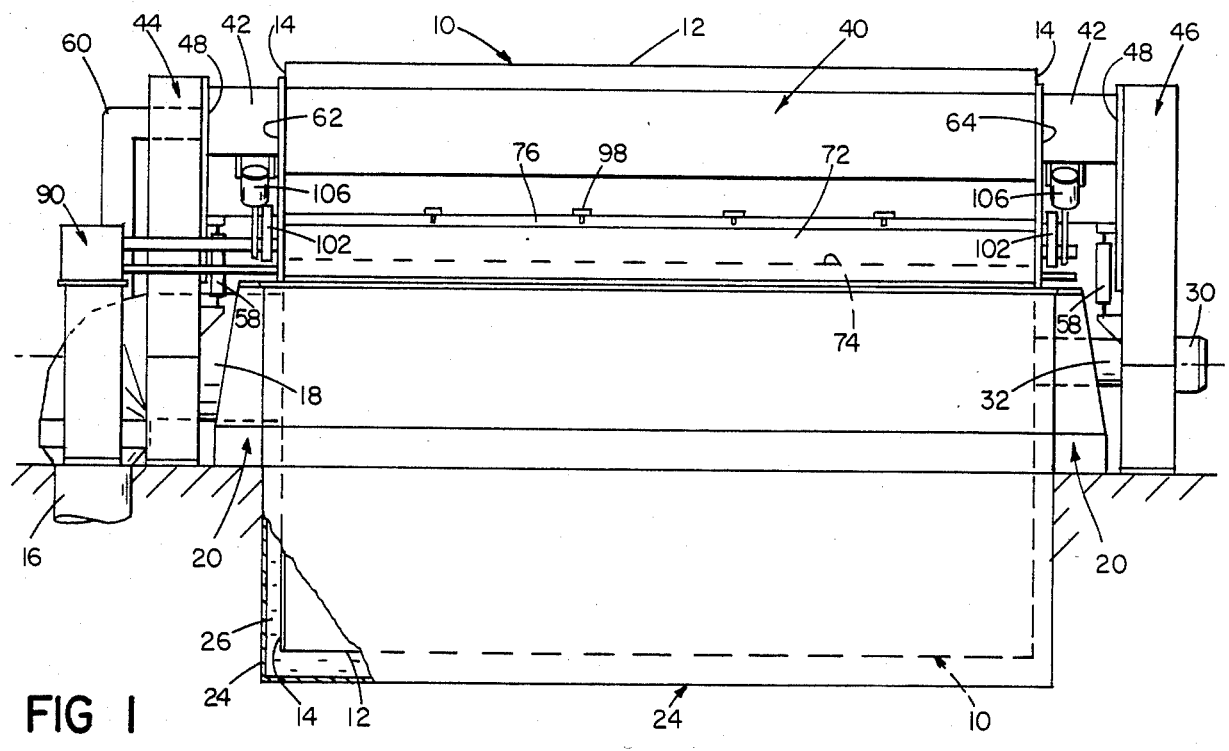
FIG. 1 is a side elevational view, with parts broken away, of a rotary drum filter construction in accordance with the invention.
Figure 2:
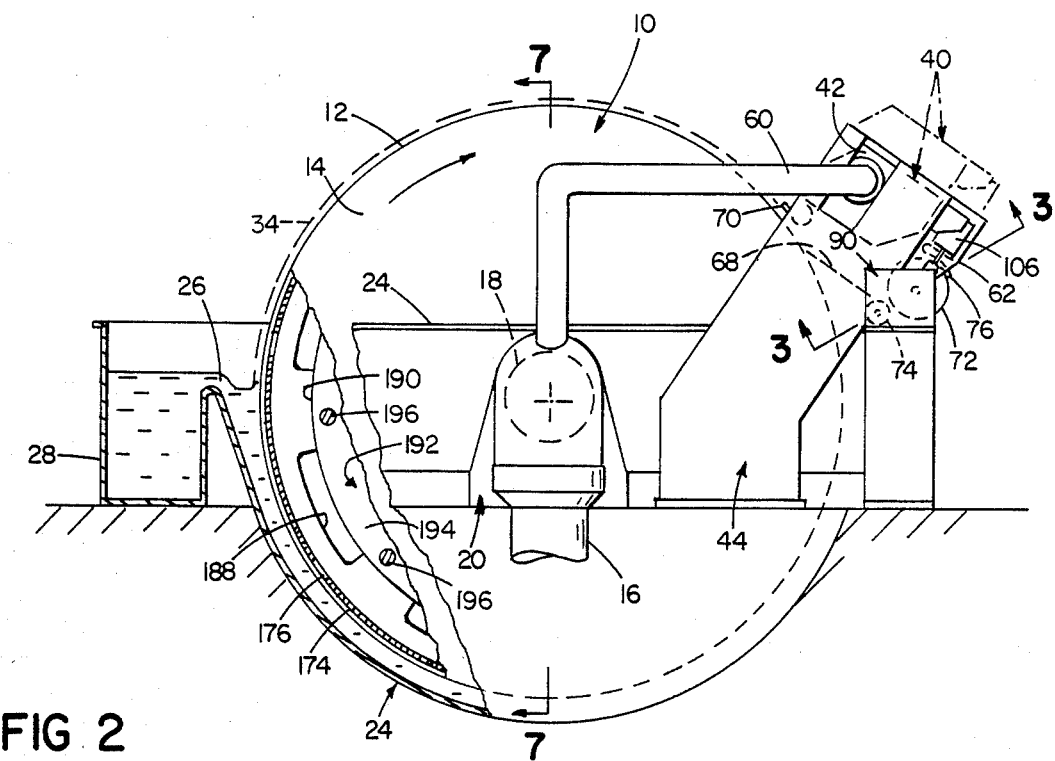
FIG. 2 is an end view, with parts broken away, of the filter construction shown in FIG. 1.

The rotary drum filter shown in FIGS. 1 and 2 include drum 10 that conventionally has a diameter of eight feet or more and a length of sixteen feet or more. Drum 10 has foraminous cylindrical surface 12 and closed end plates 14 and defines an internal chamber to which an inwardly directed pressure differential in the order of 10-15 inches of mercury is applied by barometric leg 16 through hollow discharge trunnion 18. Drum 10 is supported in conventional manner by pedestals 20 so that a lower portion is suspended in slurry vat 24 to which the slurry 26 to be filtered is flowed from inlet box 28. Drum 10 is rotatably driven (in a clockwise direction as viewed in FIG. 2) by motor 30 which is coupled to solid journal 32 or by a ring gear coupled to trunnion 18. The pressure differential applied to the drum surface 12 causes the slurry 26 to be attracted to that surface, and water or other similar material to be removed is extracted through surface 12 into the interior of the drum 10 and the remaining particles of the slurry adhere in a layer to the drum surface 12 as a pulp sheet 34 that accumulates to a typical thickness of one-half to three inches.

Mounted adjacent surface 12 of drum 10 on the descending side is a vacuum chamber take-off assembly 40 which extends the length of drum 10 parallel to the axis thereof and includes hollow structural beam 42 which extends the length of drum 10 and is supported on pedestals 44, 46 at opposite ends of the filter drum by guideways 48 that receive flange structures 50 secured to beam 42. Each guideway 48 is supported for pivoting movement by shaft 52 (FIG. 4) and is fixed against angular rotation by adjustable stops 54. Beam flanges 50 are received in guideways 48 for vertical sliding movement between a lower position determined by adjustable stops 56 and a raised position. The entire take-off assembly may be raised quickly by hydraulic cylinders 58 for purposes of washing, adjustment, or maintenance. Hollow beam 42 serves as an air duct and communicates with chamber assembly 40 through openings 38 and with barometric leg 16 through conduit 60.

Vacuum chamber take-off assembly 40 includes side plates 62, 64 that have curved lower edges which carry floating seals 66 for sealing contact with stainless steel bands 80 on the peripheral edges of filter drum 10. Extending transversely between side plates 62, 64 are pulp sheet take-off slide structure 68, front seal shoe 70 (that is adapted to be biased against pulp sheet 34), a pair of vaned discharge rolls 72, 74 that define a nip through which the pulp sheet 34 is discharged, seal shoe 76 (that is adapted to be biased against the vanes of upper discharge roll 72), and chamber closure walls 78. Take-off assembly 40 thus provides a fixed, non-valved region of subatmospheric pressure where the pulp sheet 34 is removed from filter drum 10.

Figure 4:
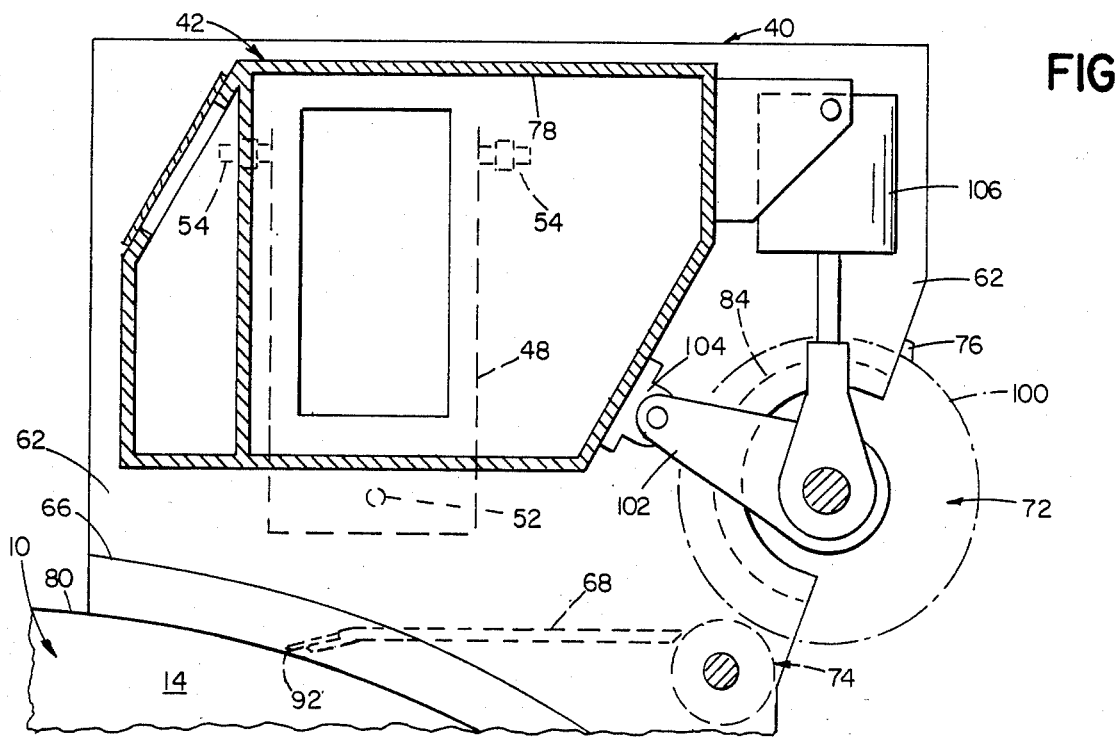
FIG. 4 is a view taken along the line 4—4 of FIG. 3 showing further aspects of the vacuum take-off chamber and support structure.
Figure 3:
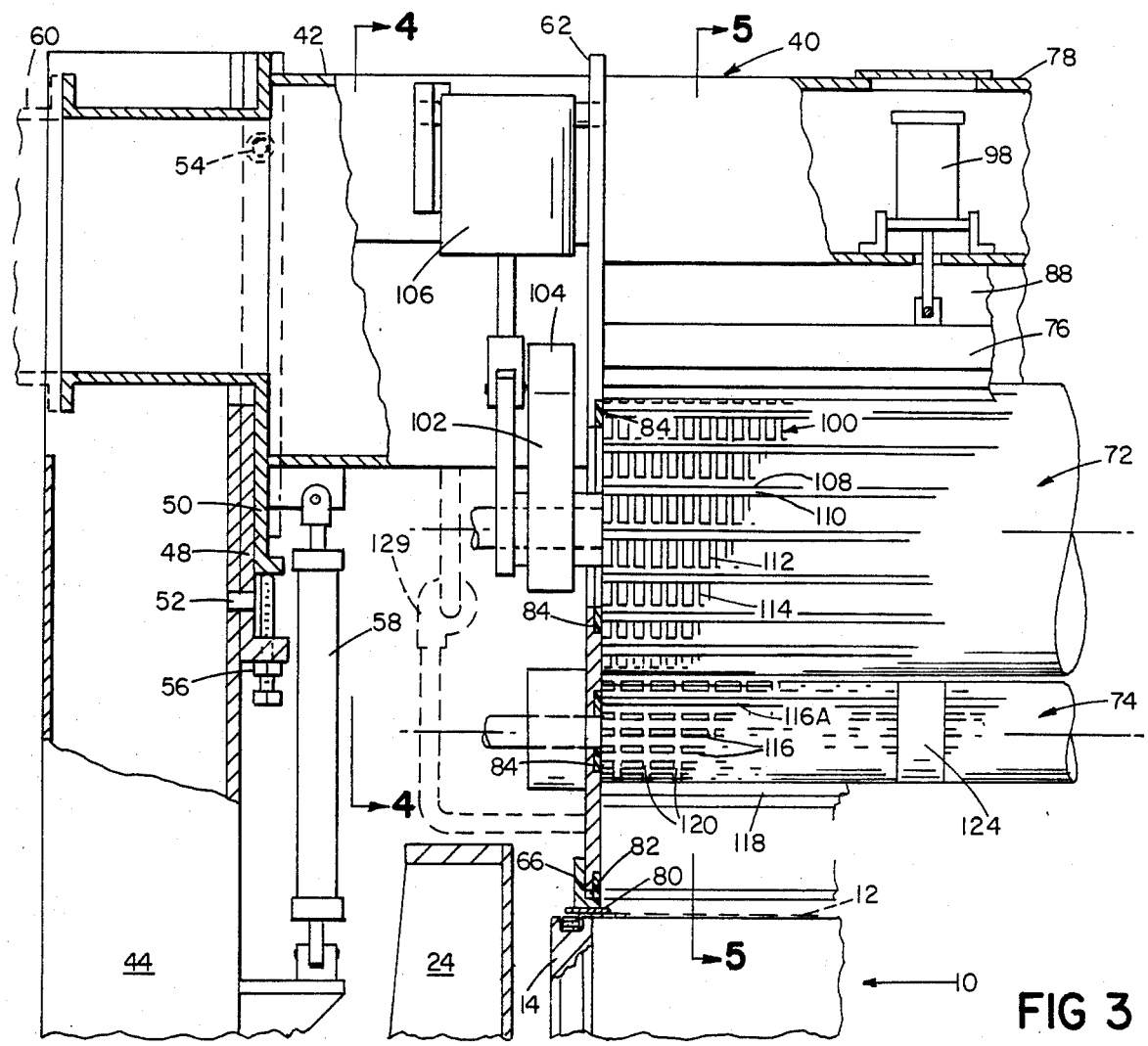
FIG. 3 is an enlarged end view generally along the line 3—3 of FIG. 2 (with parts shown in elevation) showing aspects of the vacuum take-off chamber and its support structure of the filter construction of FIG. 1.
Figure 5:
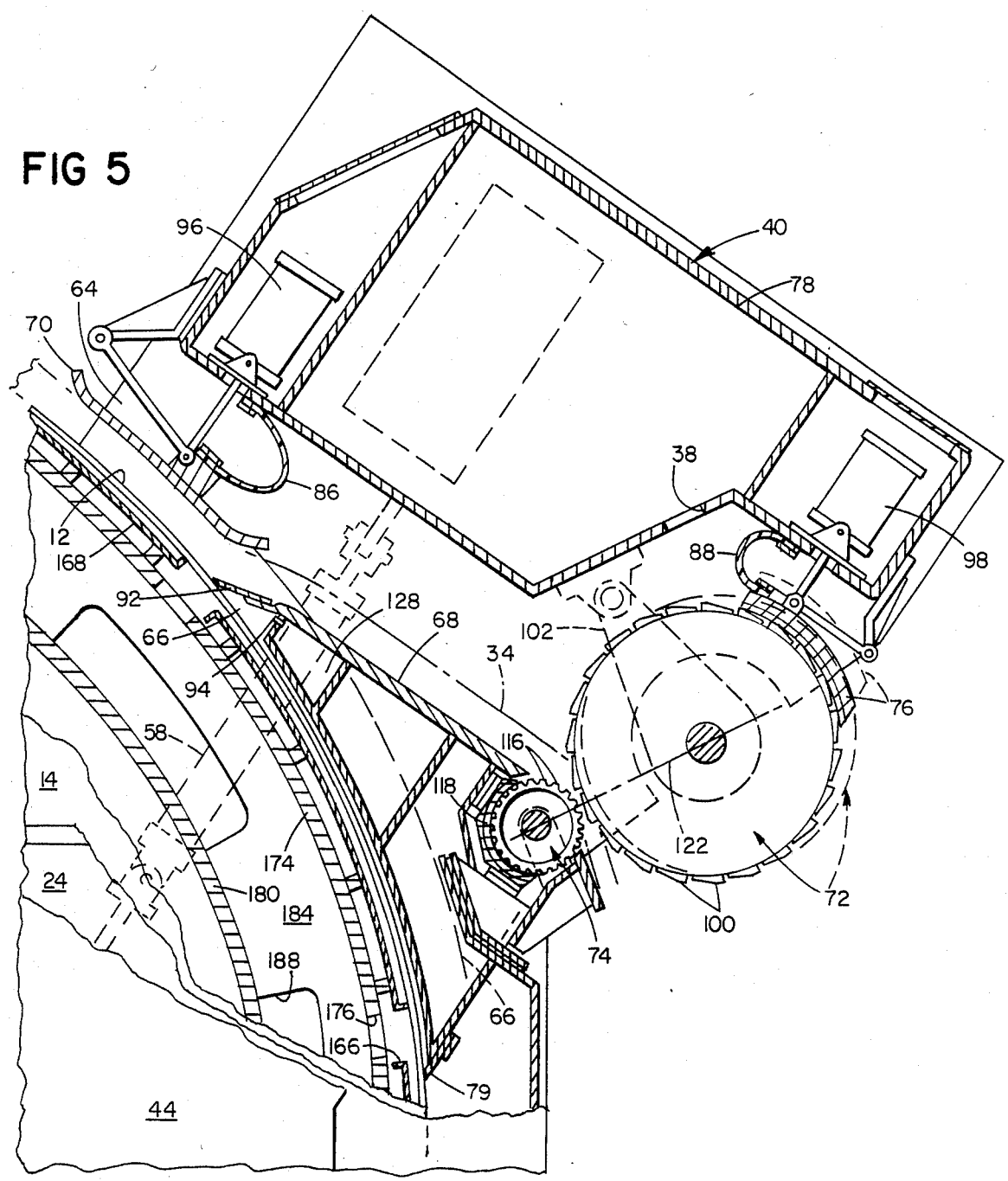
FIG. 5 is a fragmentary elevational view taken generally along the line 5—5 of FIG. 3.

Further details of vacuum chamber take-off assembly 40 may be seen with reference to FIGS. 3-5. Side plates 62, 64 are bolted to support beam 42 and carry high density polyethylene floating seals 66 which seat on stainless steel bands 80 on the periphery of filter drum 10 as indicated in FIGS. 4 and 5. Seals 66 are secured for vertical sliding movement by bolts 67 that are received in slots 69 in seal members 66 and by keeper strips 71. Air inflated tubes 82 within seal members 66 allow the side seals 66 to follow run out of drum 10 with uniform pressure and exert outward pressure on the seals 66 to overcome atmospheric pressure which would tend to restrict the vertical sliding action of seals 66 within their slotted attachments to side plates 62, 64. The drum seals 66 extend along the side plates 62, 64 beneath the slide structure 68 and into the slurry in tank 24 where sliding contact lip seal 79 at the lower end of the take-off chamber structure 40 engages foraminous drum surface 12 and provides a stock entry restriction. On the inside surface of each side plate 62, 64 are replaceable high density polyethylene type seal plate members 84 that bear against the ends of discharge rolls 72, 74, as well as the ends of seal shoes 70 and 76 and seal diaphragms 86 and 88. Seal plates 84 are biased by spring assemblies and provide compensation for thermal expansion and allowance for wear.

Figure 6:
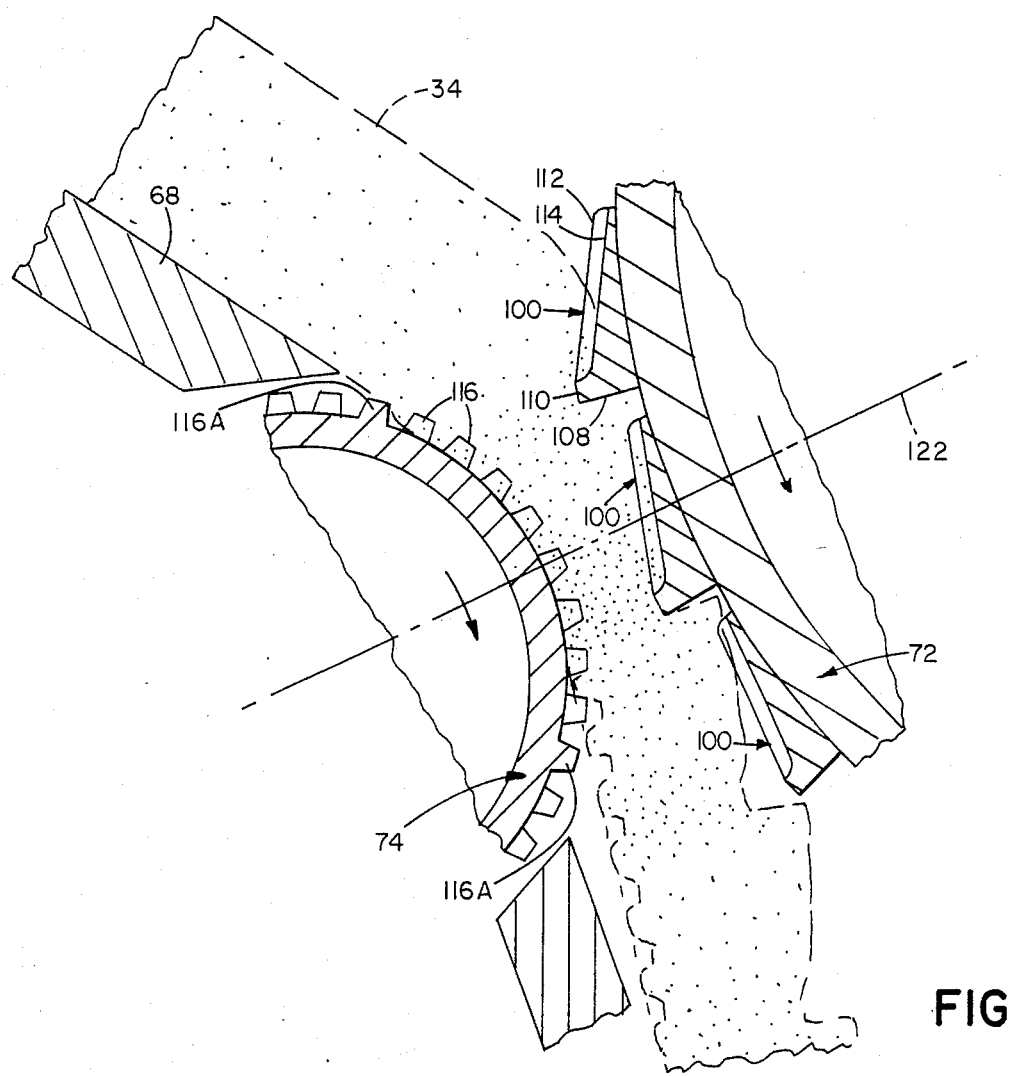
FIG. 6 is a diagrammatic indication of the sealing and pulp sheet discharge action of the vaned chamber discharge rolls of the filter construction of FIG. 1.
Figure 3A:
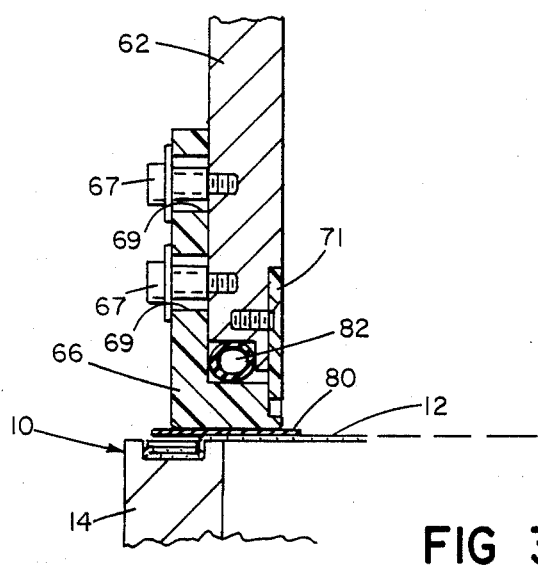
FIG. 3A is an enlarged diagrammatic view of floating seal structure employed in the vacuum take-off chamber of the filter construction of FIG. 1.

With reference to FIGS. 5 and 6, vaned discharge roll 72 (approximately fifteen inches in diameter) and cooperating vaned discharge roll 74 (approximately five inches in diameter) are driven coordinately at the same surface speed as the filter drum 10 through conventional floating shaft drives by gear reducer 90 (FIG. 1). Take-off slide structure 68 carries adjustable blade 92 that is located above and forward of fluid openings 94 through which subatmospheric air may be supplied to chamber 128 from beam 42 by a blower diagrammatically indicated at 129. Alternatively, high pressure fluid (such as water, steam or compressed air) may be supplied through nozzles to assist take-off of the pulp sheet 34 by lifting action at the drum surface ahead of blade 92. Sealing shoe 70 is biased against the pulp sheet 34 by a series of four or more air cylinders 96 spaced along the length of the take-off assembly, and flexible diaphragm 86 provides a seal between structural beam 42, the take-off assembly side walls 62, 64, and shoe 70. A similar diaphragm 88 is secured between chamber wall structure 78 and discharge roll seal shoe 76, and a similar series of air cylinders 98 maintain the necessary pressure to seat shoe 76 in sealing engagement with the vanes 100 of discharge roll 72. Roll 72 is supported on arms 102 which are pivoted from blocks 104 and the vertical position of roll 72 is controlled by air cylinders 106 to adjust the spacing of discharge roll 72 from lower discharge roll 74.

As indicated in FIGS. 5 and 6, the vanes 100 of upper discharge roll 72 are of triangular configuration and each has a continuous radially disposed lead surface 108, a continuous crest 110 (on which biased seal shoe 76 is seated), and a sloping trailing surface 112 in which is formed a series of pulp sheet release grooves 114. The vanes 116 of lower discharge roll 74 are of Acme gear tooth configuration and a fixed seal shoe 118 (of about 160° angular extent) maintains sealing engagement with vanes 116. Each vane 116 (except vanes 116A that are spaced ninety degrees apart around the periphery of roll 74) are interrupted by circumferential pressure release grooves 120. The plane of the axes of rolls 72 and 74 as indicated by line 122 (FIG. 5) is disposed at an angle of about 120° to the plane of discharge slide surface 68. As indicated in FIG. 6, after the pulp sheet 34 enters the vacuum chamber 40 and is released from the filter drum surface 12, the vanes 100, 116 engage the pulp sheet 34 and cooperate to exert an extracting or withdrawl force on the pulp sheet to drive the pulp sheet from the vacuum chamber, and the release grooves 114, 120 allow ambient air to flow along the surface of pulp sheet 34 and assist in breaking suction and release of the sheet. Both sets of vanes 100, 116 bite into the pulp sheet but do not pass through the sheet so that sheet integrity may be maintained as it is discharged for transfer to a further processing stage. Reinforcing bearing assemblies 124 are spaced along the length of lower discharge roll 74 as indicated in FIG. 3 to increase its rigidity and limit deflection due to the pressure differential between the outside atmospheric pressure and the significantly lower subatmospheric pressure within the take-off chamber and assure that alignment of the discharge rolls is maintained.

Further details of the construction of filter drum 10 may be seen with reference to FIGS. 7–10. Drum 10 has circumferential symmetry without any internal valve mechanisms and includes a conventional discharge trunnion 18 and solid rear shaft 32 (or a second discharge trunnion). The outer drainage surface is a conventional screen mesh 12 of metal or plastic supported on corrugated deck panels or conventional winding wire 170. Cylindrical outer drum shell 174 has openings 176 aligned with openings 166 in decking 168 through which filtrate enters an annular chamber 178 that is bounded by frustoconical inner drum shell 180. Axially extending members 182 on outer shell 174 provide a machined surface to support the decking 168. Disposed between the outer and inner shells 174, 180 are a series of slotted annular rings 184 that space the outer and inner shells 174, 180 and disposed inside inner shell 180 in alignment with rings 184 are a series of reinforcing rings 186 that provide support for the inner shell 180. Openings 188 allow axial flow of filtrate along the frustoconical surface 190 of shell 180 to collection chamber 192 adjacent barometric leg 16 that is defined between drum head 14 and reinforced auxiliary head 194 and through which tie rods 196 extend. Thus annularly unobstructed filtrate collection chamber 178 extends about three-quarters of the axial length of drum 10 to the filtrate transfer chamber 192 in communication with barometric leg 16. Drum 10 may be driven at greater rotational speeds than conventional filter drum constructions as there is no axial filtrate flow on the outer deck 174 as the drum 10 rotates out of submergence in the slurry 26 in vat 24.

In system operation, with the filter drum 10 being rotated at a speed of three to four revolutions per minute by drive 30, subatmospheric pressure in the order of 10–15 inches of mercury is applied via barometric leg 16 and drum chambers 192 and 178 to drum surface 12 to form pulp sheet 34 thereon. Subatmospheric pressure in the order of 10–15 inches of mercury is also applied by barometric leg 16 via conduit 60 to the interior of take-off chamber 40 so that substantially no pressure differential exists across pulp sheet 34 after it slides below lead shoe 70 into the take-off chamber. The pulp sheet 34 (typically one-half to three inches in thickness) is then lifted from the foraminous drum surface 12 by blade 92 (and supplemental lifting action of the low pressure air (or high pressure fluid) which is directed against the drum surface ahead of blade 92). Cylinders 106 position and maintain pressure on discharge roll 72 so that vanes 100 and 116 bite into (but do not pass through pulp sheet 34 as indicated in FIG. 6), the cooperating driven discharge rolls 72, 74 forcing the pulp sheet 34 out of chamber 40 against the higher outside atmospheric pressure. Flexible diaphragm 86 and cooperating biasing cylinders 96 maintain pressure on seal shoe 70 as the working vacuum fluctuates and the thickness of sheet 34 varies. Similarly, flexible diaphragm 88 and cooperating biasing cylinders 98 maintains pressure on seal shoe 76 to maintain sealing contact with the crests 110 of drive vanes 100 and seal shoe 118 maintains sealing contact with the crests of drive vanes 116 of roll 74 and minimizes entry of atmospheric air into chamber 40 in that region. A conventional drum filter system in which its internal valve mechanism is not operated and with an added vacuum chamber take-off assembly 40 may be operated in similar manner.

Figure 11:
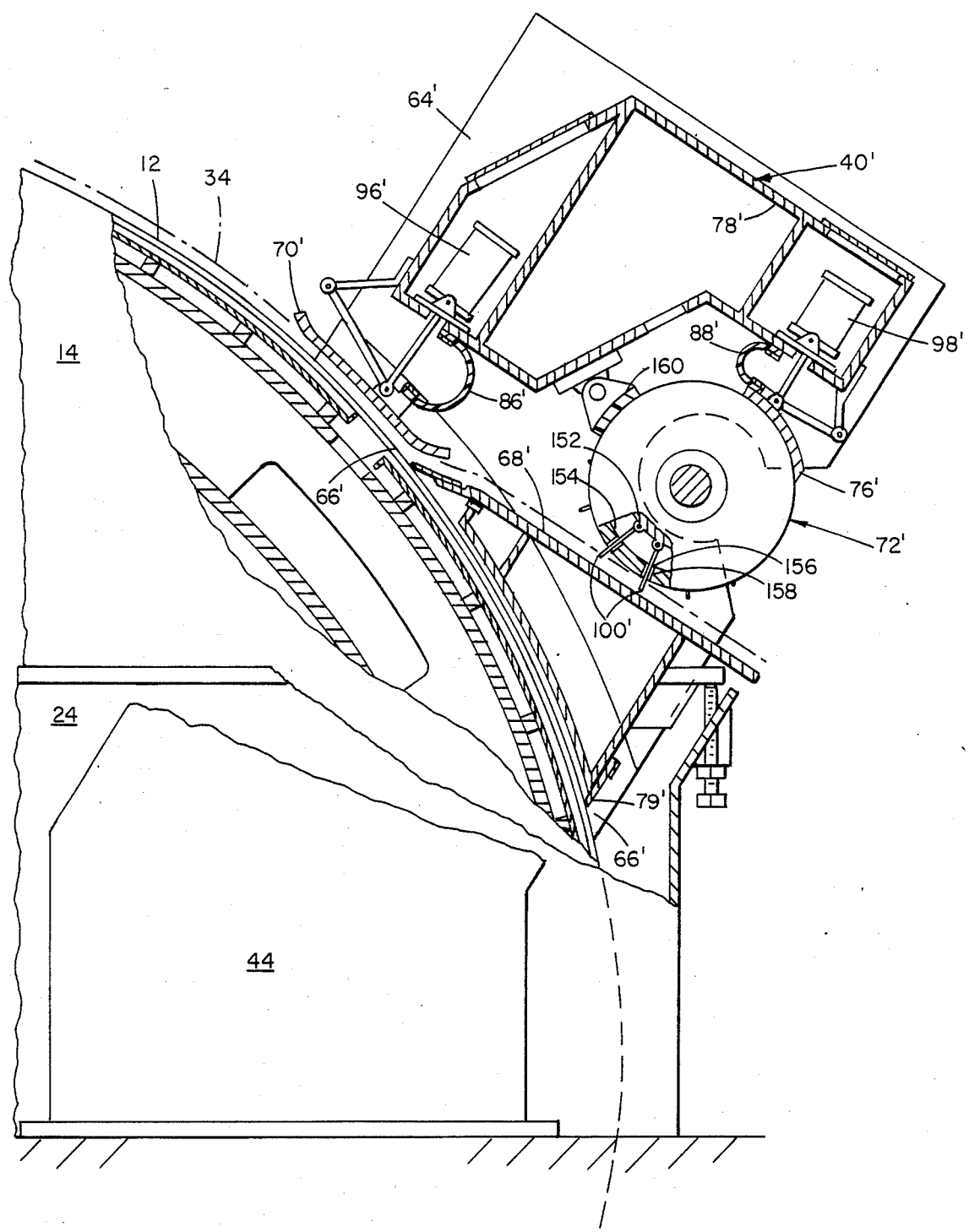
FIG. 11 is a side elevational view, partially in section, of another embodiment of vacuum take-off chamber structure in accordance with the invention.

In another embodiment (shown in FIG. 11), a similar take-off chamber construction has discharge roll 72″ with retractable vanes 100″ that are extended on the lower side of the roll to force the pulp sheet 34 into the nip between roll 72′ and slide structure 68′. As roll 72′ rotates, vanes 100′ are retracted to facilitate removal of the pulp sheet 34 from the roll face and that face is sealed against atmospheric pressure by sealing shoe 76′ to maintain vacuum within the take-off chamber 40′. In this embodiment, roll 72′ includes an internal roll 152 which carries hinged vanes 100′ within the larger roll shell 154 which is provided with slots 156 and seal inserts 158 through which the vanes 100′ project. Guide pins cause the inner roll 152 to turn with the outer shell 154 so that rolls 152 and 154 revolve at the same speed but on different fixed centers. The slots 156 in the outer roll shell 154 are provided with externally replaceable inserts 158 of high density polyethylene material which guide and support the vanes 100′. Packing strips within the inserts 158 act as air seals against the polished vanes 100′, and as atmospheric air from inside the roll vents through holes in the inserts 158 towards the vacuum chamber 40′, the packing material is forced against the vanes 100′ to compensate for packing wear. A series of pivoted shoes 160 bear against the periphery of the discharge roll 72′ to limit deflection of discharge roll 72′ towards the vacuum chamber 40′ when large pressure differentials occur.

While particular embodiments of the invention have been shown and described, various modifications will be apparent to those skilled in the art, and therefore it is not intended that the invention be limited to the disclosed embodiments or to details thereof, and departures may be made therefrom within the spirit and scope of the invention.

What is claimed is:

1. A continuous rotary drum vacuum filter system comprising
   tank structure having an open top,
   a hollow filter drum including a cylindrical foraminous surface and end plate structure to define an interior volume, shaft means extending axially in opposed directions from said end plate structure, at least one of said shaft means being hollow and in fluid communication with the interior of said drum,
   means for supporting said drum for rotation and arranged to locate at least one half of the interior volume of said drum within said tank structure,
   inlet means associated with said tank for supplying slurry to be filtered to said tank in the region outside said drum,
   means for applying subatmospheric pressure to the interior of said filter drum to draw liquid from the slurry in said tank through said foraminous surface into the interior volume of said drum and form a pulp sheet on said foraminous surface,
   outlet means for removing said filtered liquid through said hollow shaft means, and
   take-off chamber structure supported on the descending side of said drum and extending along the axial length of said foraminous surface for removing said pulp sheet from the surface of said drum, said take-off chamber support mechanism comprising end pedestals, adjustment structure secured between said take-off chamber structure and said end pedestals, and means for operating said adjustment structure to provide initial precise adjustment of the entire take-off chamber structure relative to said filter drum as well as quick lifting of the entire take-off chamber structure for washing or maintenance purposes,
   said take-off chamber structure including spaced side wall portions disposed for sealing engagement with an arcuate length of said filter drum,
   chamber entry seal structure including first seal shoe means at the entry side of the chamber for sealing engagement with the pulp sheet on the drum surface to provide a chamber entrance seal,
   pulp sheet slide structure within said take-off chamber for lifting said pulp sheet from said drum surface,
   vaned discharge roll means extending along the axial length of said foraminious surface and cooperating with said pulp sheet slide structure for discharging said pulp sheet from said take-off chamber,
   drive means for rotating said vaned discharge roll means in the direction of pulp sheet movement to draw said pulp sheet out of said take-off chamber,
   chamber discharge seal means including second seal shoe means at the discharge side of the chamber for sealing engagement with said discharge roll means to provide a chamber discharge seal, and
   means for applying substantially the same subatmospheric pressure to the interior of said take-off chamber as to the interior of said filter drum to provide substantially no pressure differential across said pulp sheet in said take-off chamber.

2. The system of claim 1 wherein said vaned discharge roll means includes cooperating upper and lower vaned discharge rolls for cooperatively engaging the pulp sheet and positively feeding it from said take-off chamber.

3. The system of claim 2 wherein said upper vaned discharge roll is at least twice the diameter of said lower vaned discharge roll and said roll drive means drives said upper and lower discharge rolls coordinately at the same surface speed as said filter drum.

4. The system of claim 2 and further including means for supporting said upper vaned discharge roll for movement towards and away from said lower discharge roll, and air cylinder means for adjusting the spacing of said upper discharge roll from said lower discharge roll.

5. The system of claim 2 wherein said second seal shoe means engages the vanes of said upper discharge roll and provides a take-off chamber seal.

6. The system of claim 5 wherein each vane of said upper discharge roll is of triangular configuration and has a continuous radially disposed lead surface, a continuous crest, and a sloping trailing surface in which is formed a series of trailing pulp sheet release grooves.

7. The system of claim 2 wherein the axes of said cooperating upper and lower vaned discharge rolls define a plane that is disposed at an angle greater than ninety degrees to said pulp sheet slide structure.

8. The system of claim 1 wherein said means for applying subatmospheric pressure applies a said pressure differential across said pulp sheet in said take-off chamber of less than 0.1 inch of mercury.

9. The system of claim 1 wherein said spaced side wall portions disposed for sealing engagement with an arcuate length of said filter drum include floating seals which seat on the periphery of said filter drum.

10. The system of claim 9 and further including metal bands on the periphery of said filter drum on which said floating seals seat.

11. The system of claim 9 wherein said vaned discharge roll means includes cooperating upper and lower vaned discharge rolls for cooperatively engaging the pulp sheet and positively feeding it from said take-off chamber.

12. The system of claim 11 wherein said upper vaned discharge roll is at least twice the diameter of said lower vaned discharge roll and said roll drive means drives said upper and lower discharge rolls coordinately at the same surface speed as said filter drum.

13. The system of claim 11 and further including means for supporting said upper vaned discharge roll for movement towards and away from said lower discharge roll, and air cylinder means for adjusting the spacing of said upper discharge roll from said lower discharge roll.

14. The system of claim 13 wherein said second seal shoe means engages the vanes of said upper discharge roll and provides a take-off chamber seal.

15. A continuous rotary drum vacuum filter system comprising tank structure having an open top, a hollow filter drum including a cylindrical foraminous surface and end plate structure to define an interior volume, shaft means extending axially in opposed directions from said end plate structure, at least one of said shaft means being hollow and in fluid communication with the interior of said drum, means for supporting said drum for rotation and arranged to locate at least one half of the interior volume of said drum within said tank structure, inlet means associated with said tank for supplying slurry to be filtered to said tank in the region outside said drum, means for applying subatmospheric pressure to the interior of said filter drum to draw liquid from the slurry in said tank through said foraminous surface into the interior volume of said drum and form a pulp sheet on said foraminous surface, outlet means for removing said filtered liquid through said hollow shaft means, and take-off chamber structure supported on the descending side of said drum and extending along the axial length of said foraminous surface for removing said pulp sheet from the surface of said drum, said take-off chamber structure including spaced side wall portions disposed for sealing engagement with an arcuate length of said filter drum, chamber entry seal structure including first seal shoe means at the entry side of the chamber for sealing engagement with the pulp sheet on the drum surface to provide a chamber entrance seal, pulp sheet slide structure within said take-off chamber for lifting said pulp sheet from said drum surface, vaned discharge roll means including cooperating upper and lower vaned discharge rolls cooperating with said pulp sheet slide structure for discharging said pulp sheet from said take-off chamber, drive means for rotating said vaned discharge roll means in the direction of pulp sheet movement to draw said pulp sheet out of said take-off chamber, chamber discharge seal means including second seal shoe means at the discharge side of the chamber for sealing engagement with the vanes of said upper discharge roll to provide a chamber discharge seal, the vanes of said upper discharge roll having crest portions against which said second seal shoe means seats and that extend continuously the length of said filter drum and trailing release channels that facilitate release of the pulp sheet from said vanes of said upper discharge roll, and means for applying substantially the same subatmospheric pressure to the interior of said take-off chamber as to the interior of said filter drum to provide substantially no pressure differential across said pulp sheet in said take-off chamber.

16. A continuous rotary drum vacuum filter system comprising tank structure having an open top, a hollow filter drum including a cylindrical foraminous surface and end plate structure to define an interior volume, shaft means extending axially in opposed directions from said end plate structure, at least one of said shaft means being hollow and in fluid communication with the interior of said drum, means for supporting said drum for rotation and arranged to locate at least one half of the interior volume of said drum within said tank structure, inlet means associated with said tank for supplying slurry to be filtered to said tank in the region outside said drum, means for applying subatmospheric pressure to the interior of said filter drum to draw liquid from the slurry in said tank through said foraminous surface into the interior volume of said drum and form a pulp sheet on said foraminous surface, outlet means for removing said filtered liquid through said hollow shaft means, and take-off chamber structure supported on the descending side of said drum and extending along the axial length of said foraminous surface for removing said pulp sheet from the surface of said drum, said take-off chamber structure including spaced side wall portions disposed for sealing engagement with an arcuate length of said filter drum, chamber entry seal structure including first seal shoe means at the entry side of the chamber for sealing engagement with the pulp sheet on the drum surface to provide a chamber entrance seal, pulp sheet slide structure within said take-off chamber for lifting said pulp sheet from said drum surface, vaned discharge roll means including cooperating upper and lower vaned discharge rolls cooperating with said pulp sheet slide structure for discharging said pulp sheet from said take-off chamber, each vane of said lower discharge roll being of gear tooth configuration, the majority of said vanes being interrupted by circumferential pressure release grooves and a minority of said vanes being axially continuous, a fixed seal shoe of angular extent greater than the spacing between said continuous vanes for maintaining sealing engagement with said vanes of said lower discharge roll, drive means for rotating said vaned discharge roll means in the direction of pulp sheet movement to draw said pulp sheet out of said take-off chamber, chamber discharge seal means including second seal shoe means at the discharge side of the chamber for sealing engagement with said discharge roll means to provide a chamber discharge seal, and means for applying substantially the same subatmospheric pressure to the interior of said take-off chamber as to the interior of said filter drum to provide substantially no pressure differential across said pulp sheet in said take-off chamber.

17. A continuous rotary drum vacuum filter system comprising tank structure having an open top, a hollow filter drum including a cylindrical foraminous surface and end plate structure to define an interior volume, shaft means extending axially in opposed directions from said end plate structure, at least one of said shaft means being hollow and in fluid communication with the interior of said drum, means for supporting said drum for rotation and arranged to locate at least one half of the interior volume of said drum within said tank structure, inlet means associated with said tank for supplying slurry to be filtered to said tank in the region outside said drum, means for applying subatmospheric pressure to the interior of said filter drum to draw liquid from the slurry in said tank through said foraminous surface into the interior volume of said drum and form a pulp sheet on said foraminous surface, outlet means for removing said filtered liquid through said hollow shaft means, and take-off chamber structure supported on the descending side of said drum and extending along the axial length of said foraminous surface for removing said pulp sheet from the surface of said drum, said take-off chamber structure including spaced side wall portions disposed for sealing engagement with an arcuate length of said filter drum, said spaced side wall portions including floating seals which seat on the periphery of said filter drum, said floating seals being secured for vertical sliding movement on said side wall portions and including resilient means within said seal members that allow said floating seals to follow run out of said drum and exert outward pressure on said seals to overcome atmospheric pressure which would tend to restrict the vertical sliding action of said seals relative to said side wall portions.

chamber entry seal structure including first seal shoe means at the entry side of the chamber for sealing engagement with the pulp sheet on the drum surface to provide a chamber entrance seal, pulp sheet slide structure within said take-off chamber for lifting said pulp sheet from said drum surface, vaned discharge roll means cooperating with said pulp sheet slide structure for discharging said pulp sheet from said take-off chamber, drive means for rotating said vaned discharge roll means in the direction of pulp sheet movement to draw said pulp sheet out of said take-off chamber, chamber discharge seal means including second seal shoe means at the discharge side of the chamber for sealing engagement with said discharge roll means to provide a chamber discharge seal, and means for applying substantially the same subatmospheric pressure to the interior of said take-off chamber as to the interior of said filter drum to provide substantially no pressure differential across said pulp sheet in said take-off chamber.

18. A continuous rotary drum vacuum filter system comprising tank structure having an open top, a hollow filter drum including a cylindrical foraminous surface and end plate structure to define an interior volume, shaft means extending axially in opposed directions from said end plate structure, at least one of said shaft means being hollow and in fluid communication with the interior of said drum, means for supporting said drum for rotation and arranged to locate at least one half of the interior volume of said drum within said tank structure, inlet means associated with said tank for supplying slurry to be filtered to said tank in the region outside said drum, means for applying subatmospheric pressure to the interior of said filter drum to draw liquid from the slurry in said tank through said foraminous surface into the interior volume of said drum and form a pulp sheet on said foraminous surface, outlet means for removing said filtered liquid through said hollow shaft means, and take-off chamber structure supported on the descending side of said drum and extending along the axial length of said foraminous surface for removing said pulp sheet from the surface of said drum, said take-off chamber structure including spaced side wall portions disposed for sealing engagement with an arcuate length of said filter drum, chamber entry seal structure including first seal shoe means at the entry side of the chamber for sealing engagement with the pulp sheet on the drum surface to provide a chamber entrance seal, pulp sheet slide structure within said take-off chamber for lifting said pulp sheet from said drum surface, vaned discharge roll means including cooperating upper and lower vaned discharge rolls cooperating with said pulp sheet slide structure for discharging said pulp sheet from said take-off chamber, means for supporting said upper vaned discharge roll for movement towards and away from said lower discharge roll, air cylinder means for adjusting the spacing of said upper discharge roll from said lower discharge roll, drive means for rotating said vaned discharge roll means in the direction of pulp sheet movement to draw said pulp sheet out of said take-off chamber, chamber discharge seal means including second seal shoe means at the discharge side of the chamber for sealing engagement with the vanes of said upper discharge roll to provide a chamber discharge seal, the vanes of said upper discharge roll having crest portions against which said second seal shoe means seats and that extend continuously the length of said filter drum and trailing release channels that facilitate release of the pulp sheet from said vanes of said upper discharge roll, and means for applying substantially the same subatmospheric pressure to the interior of said take-off chamber as to the interior of said filter drum to provide substantially no pressure differential across said pulp sheet in said take-off chamber.

19. The system of claim 18 wherein each vane of said lower discharge roll is of gear tooth configuration, the majority of said vanes being interrupted by circumferential pressure release grooves and a minority of said vanes being axialy continuous, and a fixed seal shoe of angular extent greater than the spacing between said continuous vanes for maintaining sealing engagement with said vanes of said lower discharge roll.

20. The system of claim 19 wherein the axes of said cooperating upper and lower vaned discharge rolls define a plane that is disposed at an angle greater than ninety degrees to said pulp sheet slide structure.

21. The system of claim 20 wherein said means for applying subatmospheric pressure applies a said pressure differential across said pulp sheet in said take-off chamber of less than 0.1 inch of mercury.

22. The system of claim 20 and further including stainless steel bands on the periphery of said filter drum on which said floating seals seat, and wherein said floating seals are secured for vertical sliding movement on said side wall portions and include inflated tubes within said seal members that allow said floating seals to follow run out of said drum and exert outward pressure on said seals to overcome atmospheric pressure which would tend to restrict the vertical sliding action of said seals relative to said side wall portions.

23. A continuous rotary drum vacuum filter system comprising
   a hollow filter drum,
   slurry vat structure having an open top,
   a pair of trunnions for supporting said drum for rotation in said slurry vat, at least one of said trunnions being hollow,
   said drum including cylindrical structure secured to said trunnions for supporting foraminous structure through which filtrate is drawn into the interior of the drum,
   filtrate collection structure including filtrate transfer chamber structure in communication with said hollow trunnion and an annularly unobstructed filtrate collection chamber that extends at least about three-fourths of the axial length of said drum, said filtrate collection chamber being defined by inner shell structure coaxially disposed inside said cylindrical foraminous member support structure, said inner shell structure having a drainage surface that extends to said filtrate transfer chamber structure so that an annular uninterrupted drainage region is provided along the length of said filter drum, and
   support structure between said cylindrical foraminous member support structure and said inner shell structure, said support structure allowing the free circumferential and axial flow of filtrate along said drainage surface to said filtrate transfer chamber structure adjacent said hollow discharge trunnion.
   means for applying subatmospheric pressure to the interior of said filter drum to draw liquid from the slurry in said tank through said foraminous surface into the interior volume of said drum and form a pulp sheet on said foraminous surface.
   outlet means for removing said filtered liquid through said hollow shaft means, and
   take-off chamber structure supported on the descending side of said drum and extending along the axial length of said foraminous surface for removing said pulp sheet from the surface of said drum,
   said take-off chamber structure including spaced side wall portions disposed for sealing engagement with an arcuate length of said filter drum,
   entry seal means at the leading side of the chamber for sealing engagement with the pulp sheet on the drum surface to provide a chamber entrance seal,
   pulp sheet lifting structure within said take-off chamber for lifting said pulp sheet from said drum surface,
   pulp sheet discharge means cooperating with said pulp sheet lifting structure for discharging said pulp sheet from said take-off chamber while maintaining a chamber seal,
   discharge seal means at the trailing side of the chamber for sealing engagement with said discharge roll means to provide a chamber discharge seal, and
   means for applying substantially the same subatmospheric pressure to the interior of said take-off chamber as to the interior of said filter drum to provide substantially no pressure differential across said pulp sheet in said take-off chamber.

24. The system of claim 23 wherein said drainage surface is of frustoconical configuration.

25. The system of claim 23 wherein said pulp sheet discharging means includes cooperating upper and lower vaned discharge rolls for cooperatively engaging the pulp sheet and positively feeding it from said take-off chamber.

26. The system of claim 25 wherein said upper vaned discharge roll is at least twice the diameter of said lower vaned discharge roll and said roll drive means drives said upper and lower discharge rolls coordinately at the same surface speed as said filter drum, and further including means for supporting said upper vaned discharge roll for movement towards and away from said lower discharge roll, and means for adjusting the spacing of said upper discharge roll from said lower discharge roll.

27. The system of claim 26 wherein the axes of said cooperating upper and lower vaned discharge rolls define a plane that is disposed at an angle greater than ninety degrees to said pulp sheet slide structure.

28. The system of claim 23 wherein said means for applying subatmospheric pressure applies a said pressure differential across said pulp sheet in said take-off chamber of less than 0.1 inch of mercury.

29. A continuous rotary drum vacuum filter system comprising
   a hollow filter drum,
   slurry vat structure having an open top,
   a pair of trunnions for supporting said drum for rotation in said slurry vat, at least one of said trunnions being hollow,
   said drum including cylindrical structure secured to said trunnions for supporting foraminous structure through which filtrate is drawn into the interior of the drum,
   filtrate collection structure including filtrate transfer chamber structure in communication with said hollow trunnion and an annularly unobstructed filtrate collection chamber that extends at least about three-fourths of the axial length of said drum, said filtrate collection chamber being defined by inner shell structure coaxially disposed inside said cylindrical foraminous member support structure, said inner shell structure having a drainage surface that extends to said filtrate transfer chamber structure so that an annular uninterrupted drainage region is provided along the length of said filter drum, and support structure between said cylindrical foraminous member support structure and said inner shell structure, said support structure including a series of spaced annular support rings, each said annular support ring having means defining a plurality of apertures that allow the free circumferential and axial flow of filtrate along said drainage surface, and further including supplemental support ring members inside said inner shell in alignment with said annular support rings, said support structure allowing the free axial flow of filtrate along said drainage surface to said filtrate transfer chamber structure adjacent said hollow discharge trunnion, means for applying subatmospheric pressure to the interior of said filter drum to draw liquid from the slurry in said tank through said foraminous surface into the interior volume of said drum and form a pulp sheet on said foraminous surface, outlet means for removing said filtered liquid through said hollow shaft means, and take-off chamber structure supported on the descending side of said drum and extending along the axial length of said foraminous surface for removing said pulp sheet from the surface of said drum, said take-off chamber structure including spaced side wall portions disposed for sealing engagement with an arcuate length of said filter drum, entry seal means at the leading side of the chamber for sealing engagement with the pulp sheet on the drum surface to provide a chamber entrance seal, pulp sheet lifting structure within said take-off chamber for lifting said pulp sheet from said drum surface, means cooperating with said pulp sheet lifting structure for discharging said pulp sheet from said take-off chamber while maintaining a chamber seal, discharge seal means at the trailing side of the chamber for sealing engagement with said discharge roll means to provide a chamber discharge seal, and means for applying substantially the same subatmospheric pressure to the interior of said take-off chamber as to the interior of said filter drum to provide substantially no pressure differential across said pulp sheet in said take-off chamber.

30. Apparatus for discharging filter cake in the form of wet cohesive solids from the drum of a continuous rotary drum vacuum filter comprising, in combination with a rotary filter drum that is connected by piping to a barometric leg vacuum source as a means of maintaining sub-atmospheric pressure in said filter drum, an enclosed take-off chamber mounted immediately adjacent and parallel to the face of said filter drum on the descending side thereof, take-off chamber support mechanism comprising end pedestals, adjustment structure secured between said take-off chamber structure and said end pedestals, and means for operating said adjustment structure to provide initial precise adjustment of the entire take-off chamber structure relative to said filter drum as well as quick lifting of the entire take-off chamber structure for washing or maintenance purposes, said take-off chamber being connected by piping to said filter drum barometric leg vacuum source as a means of maintaining sub-atmospheric pressure in said chamber equal to or less than internal pressure of the filter drum, front sliding shoe structure attached to said chamber structure immediately adjacent and parallel to the face of said filter drum ahead of said enclosed chamber, means for pressing said front shoe onto said filter cake solids to prevent leakage of atmospheric air into said chamber, means for sealing margins of said front shoe against atmospheric air, fixed filter cake stock slide structure that includes an adjustable blade, a smooth top surface and a concave under surface, and means for supplying fluid to said blade to aid in removing filter cake from said filter surface, the lower edge of said stock slide structure being submerged in pulp slurry, filter cake discharge means including a vaned discharge roll mounted immediately adjacent and parallel to the top surface of said stock slide structure, means for forcing said discharge roll against filter cake, means for rotating said discharge roll in the direction of movement of filter cake through said chamber structure to cause said filter cake to be forced between said roll and stock slide structure and outside to atmosphere, and means for sealing the margins of said discharge roll against atmospheric air entering said take-off chamber.

31. The apparatus of claim 30 and further including air loaded floating side seals mounted at the lower edge of said take-off chamber in sliding contact with the filter drum surface to exclude atmospheric air from said take-off chamber.

32. The apparatus of claim 31 wherein said adjustment structure includes adjustable sliding guideways secured to said take-off chamber, and hydraulic cylinder mechanisms.

33. The apparatus of claim 30 wherein the filter cake stock slide structure includes an air chamber and means for supplying blower supplied low pressure air to said air chamber for discharge into the area of said filter drum surface adjacent to said stock slide adjustable blade.

34. The apparatus of claim 30 wherein said discharge roll has retractable vanes.

35. The apparatus of claim 30 wherein said discharge roll has fixed nonretractable vanes.

36. The apparatus of claim 35 wherein said vaned discharge roll means includes cooperating upper and lower vaned discharge rolls for cooperatively engaging the pulp sheet and positively feeding it from said take-off chamber.

37. The apparatus of claim 36 wherein the axes of said cooperating upper and lower vaned discharge rolls define a plane that is disposed at an angle greater than ninety degrees to said pulp sheet slide structure.

38. The apparatus of claim 37 wherein said upper vaned discharge roll is at least twice the diameter of said lower vaned discharge roll and said roll drive means drives said upper and lower discharge rolls coordinately at the same surface speed as said filter drum, and further including means for supporting said upper vaned discharge roll for movement towards and away from said lower discharge roll, and means for adjusting the spacing of said upper discharge roll from said lower discharge roll.

39. The apparatus of claim 38 and further including means to maintain a pressure differential across said pulp sheet in said take-off chamber of less than 0.1 inch of mercury.

40. The system of claim 39 wherein said spaced side wall portions disposed for sealing engagement with an arcuate length of said filter drum include floating seals which seat on the periphery of said filter drum, and each said floating seal is secured for vertical sliding movement on said side wall portions and includes an inflated tube within said seal members that allow said floating seal to follow run out of said drum and exert outward pressure on said seal to overcome atmospheric pressure which would tend to restrict the vertical sliding action of said seal relative to said side wall portions.

41. Apparatus for discharging filter cake in the form of wet cohesive solids from the drum of a continuous rotary drum vacuum filter comprising, in combination with a rotary filter drum that is connected by piping to a barometric leg vacuum source as a means of maintaining sub-atmospheric pressure in said filter drum, an enclosed take-off chamber mounted immediately adjacent and parallel to the face of said filter drum on the descending side thereof, said take-off chamber being connected by piping to said filter drum barometric leg vacuum source as a means of maintaining sub-atmospheric pressure in said chamber equal to or less than internal pressure of the filter drum, front sliding shoe structure attached to said chamber structure immediately adjacent and parallel to the face of said filter drum ahead of said closed chamber, means for pressing said front shoe onto said filter cake solids to prevent leakage of atmospheric air into said chamber, means for sealing margins of said front shoe against atmospheric air, fixed filter cake stock slide structure that includes an adjustable blade, a smooth top surface and a concave under surface, and means for supplying fluid to said blade to aid in removing filter cake from said filter surface, the lower edge of said stock slide structure being submerged in pulp slurry, filter cake discharge means including a vaned discharge roll mounted immediately adjacent and parallel to the top surface of said stock slide structure, means for forcing said discharge roll against filter cake, means for rotating said discharge roll in the direction of movement of filter cake through said chamber structure to cause said filter cake to be forced between said roll and stock slide structure and outside to atmosphere, said discharge roll having means to retract its vanes on the discharge side of the roll remote from said stock slide structure and extend its vanes within said discharge chamber adjacent said stock slide structure, and means for sealing the margins of said discharge roll against atmospheric air entering said take-off chamber.

42. Apparatus for discharging filter cake in the form of wet cohesive solids from the drum of a continuous rotary drum vacuum filter comprising, in combination with a rotary filter drum that is connected by piping to a barometric leg vacuum source as a means of maintaining sub-atmospheric pressure in said filter drum, an enclosed take-off chamber mounted immediately adjacent and parallel to the face of said filter drum on the descending side thereof, said take-off chamber being connected by piping to said filter drum barometric leg vacuum source as a means of maintaining sub-atmospheric pressure in said chamber equal to or less than internal pressure of the filter drum, front sliding shoe structure attached to said chamber structure immediately adjacent and parallel to face of said filter drum ahead of said closed chamber, said front sealing shoe structure being designed to slide on the surface of the filter cake, means including a plurality of small air cylinders for pressing said front shoe onto said filter cake solids to prevent leakage of atmospheric air into said chamber, means for sealing margins of said front shoe against atmospheric air including a top diaphragm seal provided in a manner that allows variation in filter cake thickness and fluctuation in operating vacuum at a given setting of air cylinder pressure, fixed filter cake stock slide structure that includes an adjustable blade, a smooth top surface and a concave under surface, and means for supplying fluid to said blade to aid in removing filter cake from said filter surface, the lower edge of said stock slide structure being submerged in pulp slurry, filter cake discharge means including a discharge roll mounted immediately adjacent and parallel to the top surface of said stock slide structure, means for forcing said discharge roll against filter cake, means for rotating said discharge roll in the direction of movement of filter cake through said chamber structure to cause said filter cake to be forced between said roll and stock slide structure and outside to atmosphere, and means for sealing the margins of said discharge roll against atmospheric air entering said take-off chamber.

* * * * *